US009418261B2

(12) United States Patent
Rosengren

(10) Patent No.: US 9,418,261 B2
(45) Date of Patent: Aug. 16, 2016

(54) REGISTERING OF A TRANSPONDER TAG VIA AN ALTERNATING ELECTROMAGNETIC FIELD

(71) Applicant: DELAVAL HOLDING AB, Tumba (SE)

(72) Inventor: Anders Rosengren, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 0 days.

(21) Appl. No.: 14/440,603

(22) PCT Filed: Nov. 22, 2013

(86) PCT No.: PCT/SE2013/051379
§ 371 (c)(1),
(2) Date: May 5, 2015

(87) PCT Pub. No.: WO2014/081383
PCT Pub. Date: May 30, 2014

(65) Prior Publication Data
US 2015/0302229 A1 Oct. 22, 2015

Related U.S. Application Data

(60) Provisional application No. 61/729,433, filed on Nov. 23, 2012.

(30) Foreign Application Priority Data

Nov. 23, 2012 (SE) ...................................... 1251326

(51) Int. Cl.
*G06K 7/10* (2006.01)
*G06K 7/00* (2006.01)

(52) U.S. Cl.
CPC .......... *G06K 7/10128* (2013.01); *G06K 7/0008* (2013.01); *G06K 7/10336* (2013.01); *G06K 7/10356* (2013.01)

(58) Field of Classification Search
CPC ............ G06K 7/10128; G06K 7/0008; G06K 7/10336; G06K 7/10356
See application file for complete search history.

(56) References Cited

U.S. PATENT DOCUMENTS

| 4,260,990 A | 4/1981 | Lichtblau |
| 2005/0231330 A1 | 10/2005 | Drews et al. |
| 2009/0058606 A1* | 3/2009 | Munch et al. ......... G01S 13/758 340/10.1 |

FOREIGN PATENT DOCUMENTS

| EP | 0 608 961 A1 | 8/1994 |
| EP | 0 646 984 A1 | 4/1995 |

(Continued)

OTHER PUBLICATIONS

International-Type Search Report, dated May 24, 2013, from corresponding PCT application.
International Search Report, dated Mar. 24, 2014, from corresponding PCT application.

(Continued)

*Primary Examiner* — Leon Flores
(74) *Attorney, Agent, or Firm* — Young & Thompson

(57) ABSTRACT

A transmitter circuit generates an electric source signal, and emits a corresponding alternating electromagnetic field. A receiver antenna registers the alternating electromagnetic field and any modifications thereof due the presence of a tag unit within a range of operation. The receiver antenna is arranged relative to the transmitter antenna and a potential tag unit, such that a portion of the emitted alternating electromagnetic field reaches the receiver antenna unmodified irrespective of whether or not a tag unit is present within the range of operation. A receiver circuit connected to the receiver antenna produces an electric detection signal in response to the alternating electromagnetic fields. Based on the electric detection signal, a processing unit discriminates identification data of any tag unit having modified the alternating electromagnetic field by utilizing an aiding signal component originating from the unmodified portion of the alternating electromagnetic field.

20 Claims, 4 Drawing Sheets

(56) References Cited

FOREIGN PATENT DOCUMENTS

| FR | 2 836 581 A1 | 8/2003 |
| WO | 87/04865 A1 | 8/1987 |
| WO | 94/19781 A1 | 9/1994 |

OTHER PUBLICATIONS

Supplementary International Search Report, Feb. 6, 2015, from corresponding PCT application.

* cited by examiner

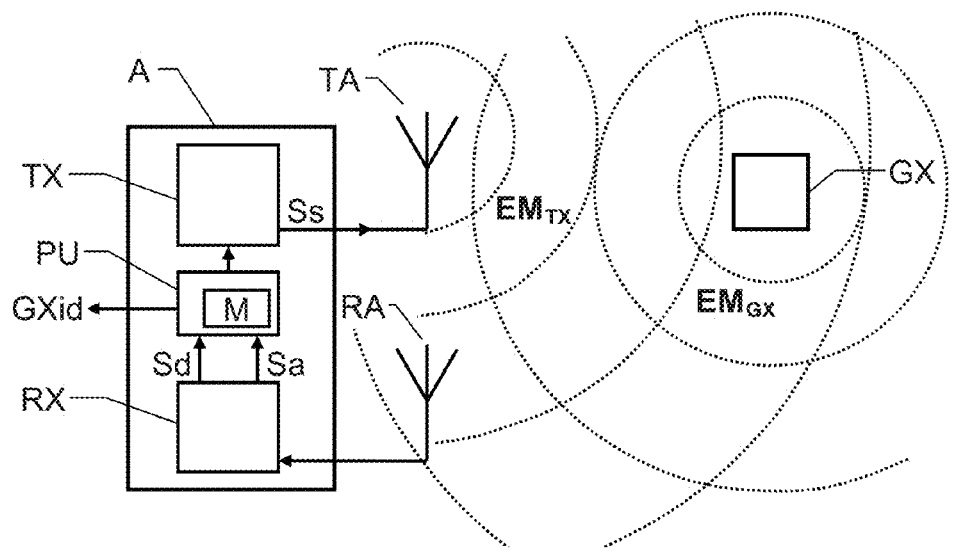
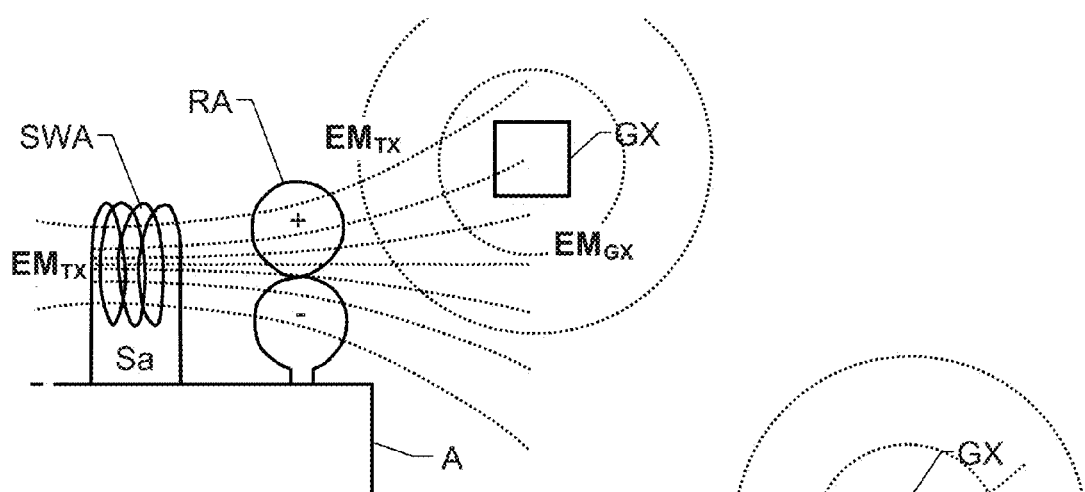
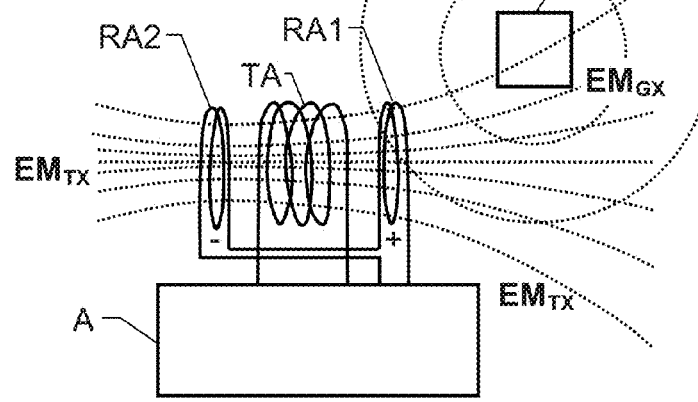

REGISTERING OF A TRANSPONDER TAG VIA AN ALTERNATING ELECTROMAGNETIC FIELD

THE BACKGROUND OF THE INVENTION AND PRIOR ART

The present invention relates generally to solutions for contactless reading of data. More particularly the invention relates to an apparatus according to the preamble of claim 1 and a method according to the preamble of claim 10. The invention also relates to a computer program product according to claim 17 and a computer readable medium according to claim 18.

Traditionally, data from transponder tags have been registered via transmitter-receiver equipment, where the signal from the tag is demodulated based on envelope detection, i.e. by an approach involving amplitude demodulation. Although, the components required thereby can be made relatively uncomplicated, the technology is fairly inefficient in terms of power consumption.

U.S. Pat. No. 4,260,990 discloses an antenna system having a transmitting antenna with at least one loop lying in a plane, and a receiving antenna having at least two twisted loops lying in a common plane with each loop being twisted 180 degrees and in phase opposition with each adjacent loop. The transmitting and receiving antennas are disposed in spaced substantially parallel relationship across an aisle or passage through which a resonant tag circuit must pass for detection. Hence, the transmitter and receiver are physically separated from one another by a distance given by the width of the aisle/passage for passing the resonant tag circuit through the emitted radio field.

EP 608 961 and EP 646 984 show examples of electromagnetic detection systems for detecting or identifying labels containing at least one resonant circuit, where a label's resonance frequency is indicative of its identity.

WO 94/19781 describes a system for identifying an electronic transponder, where the system includes a transmitter unit and at least one transmitting antenna coupled thereto for generating an electromagnetic interrogation field. A detection unit in the system detects signals emitted by the transponders when they are located in the interrogation field. To this aim, the detection unit has a means for detecting signals coming from different transponders on the basis of strength differences between these signals. In one embodiment, in order to tune the receiver unit to frequency band of the interrogation field emitted by the transmitter unit, a signal representing the frequency or frequencies of the interrogation field is supplied from the transmitter to the receiver unit through an interconnecting wire line.

PROBLEMS ASSOCIATED WITH THE PRIOR ART

The above documents present different solutions for reading out data from tag units in a contactless manner. Nevertheless, the radio technology is here comparatively inefficient with respect to energy consumption. Therefore, these solutions are not optimal for low-power implementations, such as general ID tags for animals, where also robustness and simplicity are important factors.

SUMMARY OF THE INVENTION

The object of the present invention is to solve the above problem, and thus offer an improved remote registering of tag units.

According to one aspect of the invention, the object is achieved by the initially described apparatus, wherein the receiver antenna is arranged relative to the transmitter antenna and a potential tag unit, such that a portion of the emitted alternating electromagnetic field reaches the receiver antenna unmodified irrespective of whether or not a tag unit is present within the range of operation. The processing unit is configured to discriminate the identification data by utilizing an aiding signal component originating from the unmodified portion of the alternating electromagnetic field.

This design is advantageous because the combined transmitter-receiver apparatus enables a very power efficient detection of low-complexity tag units. Consequently, data from such tag units may be read out from relatively long distances via an apparatus having moderate energy consumption.

According to one preferred embodiment of this aspect of the invention, the receiver antenna contains at least one antenna coil that is arranged in a transmission path for the alternating electromagnetic field between the transmitter antenna and a potential tag unit within the range of operation. Thus, the receiver antenna may pick up the emitted alternating electromagnetic field in a straightforward manner.

According to another preferred embodiment of this aspect of the invention, the receiver antenna includes at least one first antenna coil and at least one second antenna coil. The at least one first antenna coil is arranged on an operative side of the transmitter antenna, and is located in the transmission path for the alternating electromagnetic field between the transmitter antenna and a potential tag unit within the range of operation. The at least one second antenna coil is arranged on a passive side of the transmitter antenna, and is configured to provide the unmodified portion of the alternating electromagnetic field to the receiver circuit. This arrangement is advantageous because it allows a reliable reception of any identification data signal from a tag unit, and at the same time, it provides a solid basis for the aiding signal component.

According to yet another preferred embodiment of this aspect of the invention, the processing unit is configured to derive the aiding signal component to represent a phase angle of the electric source signal as a function of time. The processing unit is also configured to discriminate the identification data based on phase variations of the electric detection signal relative to the phase angle of the electric source signal. Further, the processing unit is preferably configured to discriminate the identification data by exclusively analyzing the electric detection signal at predetermined phase angle shifts relative to the electric source signal. Thereby, a highly efficient data-readout is enabled.

According to still another preferred embodiment of this aspect of the invention, the processing unit is configured to discriminate the identification data by exclusively analyzing the electric detection signal at time instances corresponding to phase angles where the electric source signal has zero-line passages. Namely, these instances represent optimal sampling points for the type of single sideband signal that the tag unit is presumed to produce in response to the emitted electromagnetic field.

According to a further preferred embodiment of this aspect of the invention, the apparatus includes an auxiliary antenna configured to receive the aiding signal component and forward the aiding signal component to the processing unit. This improves the chances of providing the processing unit with a high-quality basis for the aiding signal.

According to one preferred embodiment of this aspect of the invention, the processing unit contains a sampling circuit, a differential amplifier and a filter unit. The sampling circuit is configured to sample the electric detection signal at the time instances corresponding to the phase angles where the electric source signal has zero-line passages. The differential amplifier is configured to receive the sample values from the sampling circuit, and based thereon form a resultant signal containing a signal component representing the identification data. The filter unit is configured to bandpass filter the resultant signal to produce the identification data. This design is beneficial, since it enables a reliable detection of the identification data.

According to yet another preferred embodiment of this aspect of the invention, the transmitter antenna and the receiver antenna are co-located and arranged relative to one another such that during normal operation of the apparatus a distance between the transmitter antenna and the receiver antenna is shorter than an expected distance between the tag unit and any of the transmitter antenna and the receiver antenna. This design, which is enabled by the proposed use of the aiding signal component, allows a highly compact and small-sized apparatus.

According to another aspect of the invention, the object is achieved by the method described initially, wherein an unmodified portion of the emitted alternating electromagnetic field is received via the receiver antenna irrespective of whether or not a tag unit is present within the range of operation. The identification data are discriminated by utilizing an aiding signal component originating from the unmodified portion of the alternating electromagnetic field. The advantages of this method, as well as the preferred embodiments thereof, are apparent from the discussion above with reference to the proposed apparatus.

According to a further aspect of the invention the object is achieved by a computer program product, which is loadable into the memory of a computer, and includes software adapted to implement the method proposed above when said program is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIG. 1 shows a general overview of the proposed apparatus;

FIG. 2 shows an apparatus according to a first embodiment of the invention;

FIG. 3 shows an apparatus according to a second embodiment of the invention;

DESCRIPTION OF PREFERRED
EMBODIMENTS OF THE INVENTION

We refer initially to FIG. 1, which shows a general overview of an apparatus A for contactless identification of a tag unit GX according to the invention.

The tag unit GX is presumed to include circuitry configured to modify an alternating electromagnetic field $EM_{TX}$ within which the tag unit GX is located. Typically, to this aim, the tag unit GX contains at least one resonance circuit.

The apparatus A includes a transmitter circuit TX, a transmitter antenna TA, a receiver circuit RX, a receiver antenna RA and a processing unit PU.

The transmitter circuit TX is configured to generate an electric source signal Ss and, via the transmitter antenna TA connected thereto, emit an alternating electromagnetic field $EM_{TX}$ from the apparatus A, which alternating electromagnetic field $EM_{TX}$ corresponds to the electric source signal Ss.

The receiver antenna RA is configured to register the alternating electromagnetic field $EM_{TX}$ and any modifications thereof $EM_{GX}$ that are caused by the presence of a tag unit GX within a range of operation from the apparatus A. The receiver circuit RX is connected to the receiver antenna RA. Thereby, receiver circuit RX is further configured to produce an electric detection signal Sd in response to the alternating electromagnetic field $EM_{TX}$, and $EM_{GX}$ registered by the receiver antenna RA.

The processing unit PU is configured to receive the electric detection signal Sd. Based on the electric detection signal Sd, the processing unit PU is configured to discriminate identification data GXid of any tag unit GX having modified the alternating electromagnetic field $EM_{GX}$.

Figure 4:
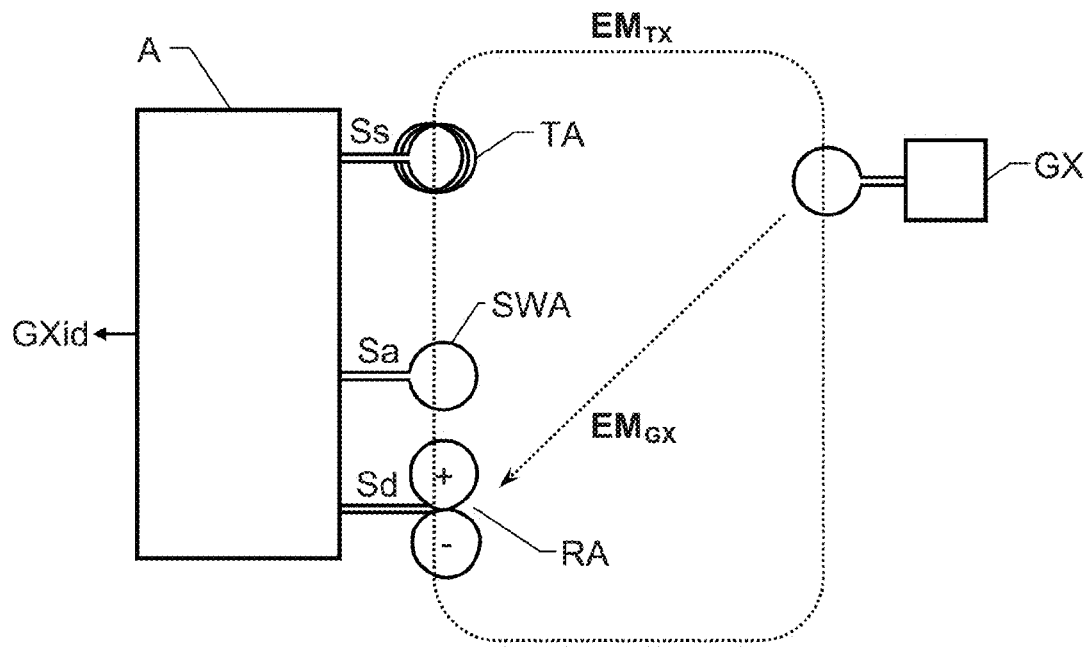
FIG. 4 illustrates how a tag unit produces a modified alternating electromagnetic field and how the proposed apparatus may receive a signal based thereon.

To provide an aiding signal component Sa (i.e. a reference signal) to the processing unit PU, and thus facilitate discriminating the identification data GXid, the receiver antenna RA is arranged relative to the transmitter antenna TA and a potential tag unit GX, such that a portion of the emitted alternating electromagnetic field $EM_{TX}$ always reaches the receiver antenna RA unmodified, irrespective of whether or not a tag unit GX is present within the range of operation. FIGS. 2, 3 and 4 show different examples how this may be accomplished.

Thus, more precisely, the processing unit PU is configured to discriminate the identification data GXid based on the electric detection signal Sd and by utilizing the aiding signal component Sa, i.e. a signal originating from the unmodified portion of the alternating electromagnetic field $EM_{TX}$.

Referring now to FIG. 2, we see a part of an apparatus A according to a first embodiment of the invention.

The receiver antenna RA is arranged in a transmission path for the emitted alternating electromagnetic field $EM_{TX}$ between the transmitter antenna (not shown) and a potential tag unit GX within the range of operation. This means that the receiver antenna RA will register the emitted alternating electromagnetic field $EM_{TX}$ as well as any modifications thereof $EM_{GX}$ caused by the tag unit GX.

The receiver antenna RA here has at least two loops of antenna coil, where a first loop + is twisted 180 degrees and in phase opposition with a second loop –. The first and second loops +/– are arranged in the transmission path for the emitted alternating electromagnetic field $EM_{TX}$, such that the emitted unmodified alternating electromagnetic field $EM_{TX}$ that passes through both the first and second loops +/– is cancelled out. However, the tag unit GX is expected to be located such that the distance between the tag unit GX and the first loop + is always different from the distance between the tag unit GX and the second loop –. In other words, the apparatus A is positioned such that the tag unit GX may only be located where its distance to the receiver antenna RA is shorter than its distance to the transmitter antenna. I.e., in FIG. 2, the tag unit is located on the general right hand side. As a result, the modified alternating electromagnetic field $EM_{GX}$ will not cancel out in the receiver antenna, and can therefore be detected by the apparatus A.

Moreover, the apparatus A preferably has an auxiliary antenna SWA, which is configured to receive the emitted unmodified alternating electromagnetic field $EM_{TX}$ to represent the aiding signal component Sa. The aiding signal component Sa is then forwarded to the processing unit PU for use when discriminating the identification data GXid.

FIG. 3 shows an apparatus A according to a second embodiment of the invention. Here, the receiver antenna RA contains at least one first antenna coil RA1 and at least one second antenna coil RA2.

The at least one first antenna coil RA1 is arranged on an operative side of the transmitter antenna TA, which in FIG. 3, is the general right hand side. The at least one first antenna coil RA1 is further located in the transmission path for the alternating electromagnetic field between the transmitter antenna TA and a potential tag unit GX within the range of operation on the operative side of the transmitter antenna TA. Consequently, the at least one first antenna coil RA1 may receive both the emitted unmodified alternating electromagnetic field $EM_{TX}$ and any modifications thereof $EM_{GX}$ due to the presence of a tag unit GX.

The at least one second antenna coil RA2 is arranged on a passive side of the transmitter antenna TA, which passive side is opposite to the operative side. Thereby, the at least one second antenna coil RA2 is configured to receive an unmodified portion of the alternating electromagnetic field $EM_{TX}$. Thus, the at least one second antenna coil RA2 can provide the aiding signal component Sa to the receiver circuit RX.

FIG. 4 shows the apparatus A according to one embodiment of the invention. As described above, the apparatus A emits an alternating electromagnetic field $EM_{TX}$ via a transmitting antenna TX. The alternating electromagnetic field $EM_{TX}$ covers an operative range from the apparatus A. We assume that a tag unit GX is located within the operative range, and thus produces a modified alternating electromagnetic field $EM_{GX}$ in response to the emitted alternating electromagnetic field $EM_{TX}$.

This modification may involve phase-shift modulating of a data signal onto the emitted alternating electromagnetic field $EM_{TX}$, where the data signal has a rate substantially lower than the frequency of the emitted alternating electromagnetic field $EM_{TX}$, say a factor 100 lower, and the data signal represents an identification of the tag unit GX. Nevertheless, due to a resonance circuit in the tag unit GX, the modification therein typically also results in a –90 degrees phase shift of the emitted alternating electromagnetic field $EM_{TX}$. The emitted alternating electromagnetic field $EM_{TX}$ may thus be regarded as a –90° phase shifted, single-side-band modulated signal propagating towards the apparatus A resulting from a reflection of the emitted alternating electromagnetic field $EM_{TX}$ in the tag unit GX.

The operative range is defined as the distance from the apparatus A within which a tag unit GX must be located in order to enable the apparatus A to discriminate identification data GXid from its modified alternating electromagnetic field $EM_{GX}$. Since the tag unit GX is a truly passive element, and the power level of the electromagnetic field decreases with a cubic relationship to the distance, the operative range is relatively short. Nevertheless, a power level difference of 80-100 dBA between the $EM_{TX}$ and $EM_{GX}$ fields is normally acceptable. This is explained by the fact that, as explained above, the emitted alternating electromagnetic field $EM_{TX}$ cancels out in the receiver antenna RA, whereas the modified alternating electromagnetic field $EM_{GX}$ does not.

An auxiliary antenna SWA in the apparatus A is configured to receive an unmodified version of the emitted alternating electromagnetic field $EM_{TX}$ and forward a corresponding aiding signal component Sa to the processing unit PU therein. Further, the processing unit PU is configured to derive the aiding signal component Sa to represent a phase angle of the electric source signal Ss as a function of time, and finally discriminate the identification data GXid based on the phase variations of the electric detection signal Sd relative to the phase angle of the electric source signal Ss.

Preferably, the transmitter antenna TA and the receiver antenna RA are co-located and arranged relative to one another, such that during normal operation of the apparatus A, a distance between the transmitter antenna TA and the receiver antenna RA is shorter than an expected distance between the tag unit GX and any of the transmitter antenna TA and the receiver antenna RA. This relationship between said distances can be guaranteed by placing the transmitter and receiver antennas TA and RA behind an antenna dome, where the distance from the respective antennas and the dome exceeds the distance between the transmitter antenna TA and the receiver antenna RA. Namely, thereby, any tag unit TX must always be further away from the transmitter and receiver antennas TA and RA than the distance between the two of them. Such a design is, of course, enabled by the proposed use of the aiding signal component Sa. The relatively short distance between the transmitter and receiver antennas TA and RA allows a highly compact and small-sized apparatus A, especially compared to a design where the transmitter and receiver antennas are arranged on different sides of aisle (or similar) along which individuals carrying the tag units GX proceed.

Figure 5:
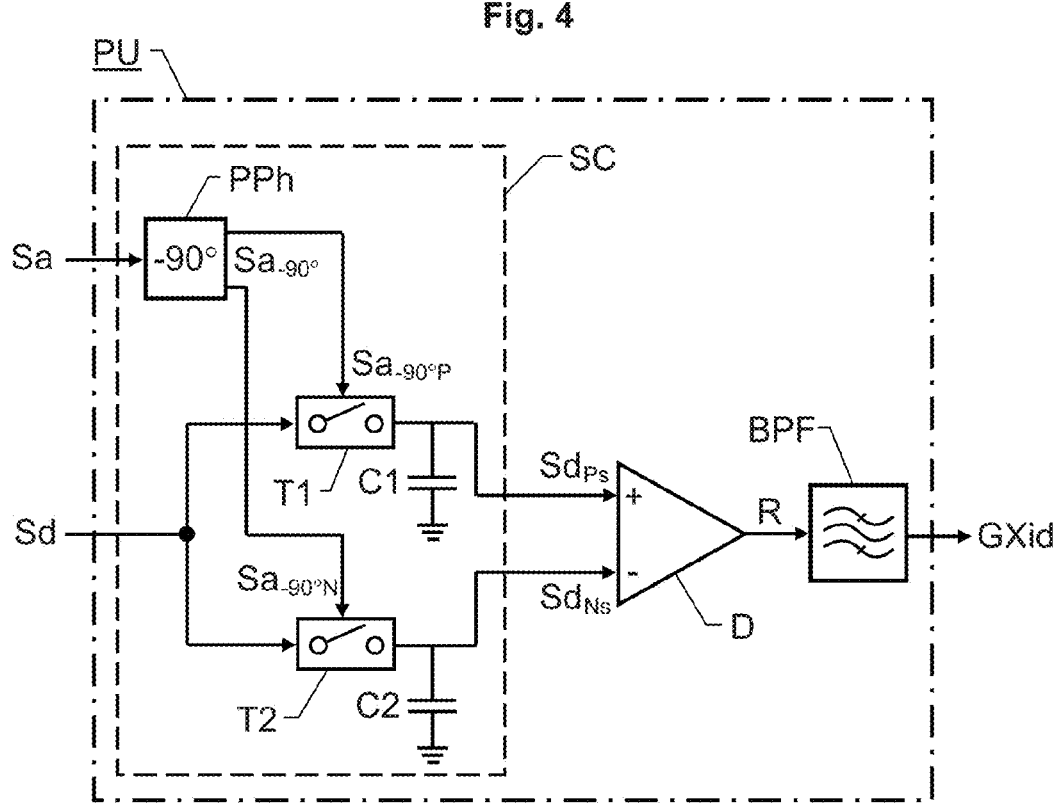
FIG. 5 shows the processing unit according to one embodiment of the invention.

FIG. 5 shows a schematic block diagram of the processing unit PU according to one embodiment of the invention, and FIGS. 6a to 6f represent graphs illustrating the different signals in the processing unit PU.

Figure 6:
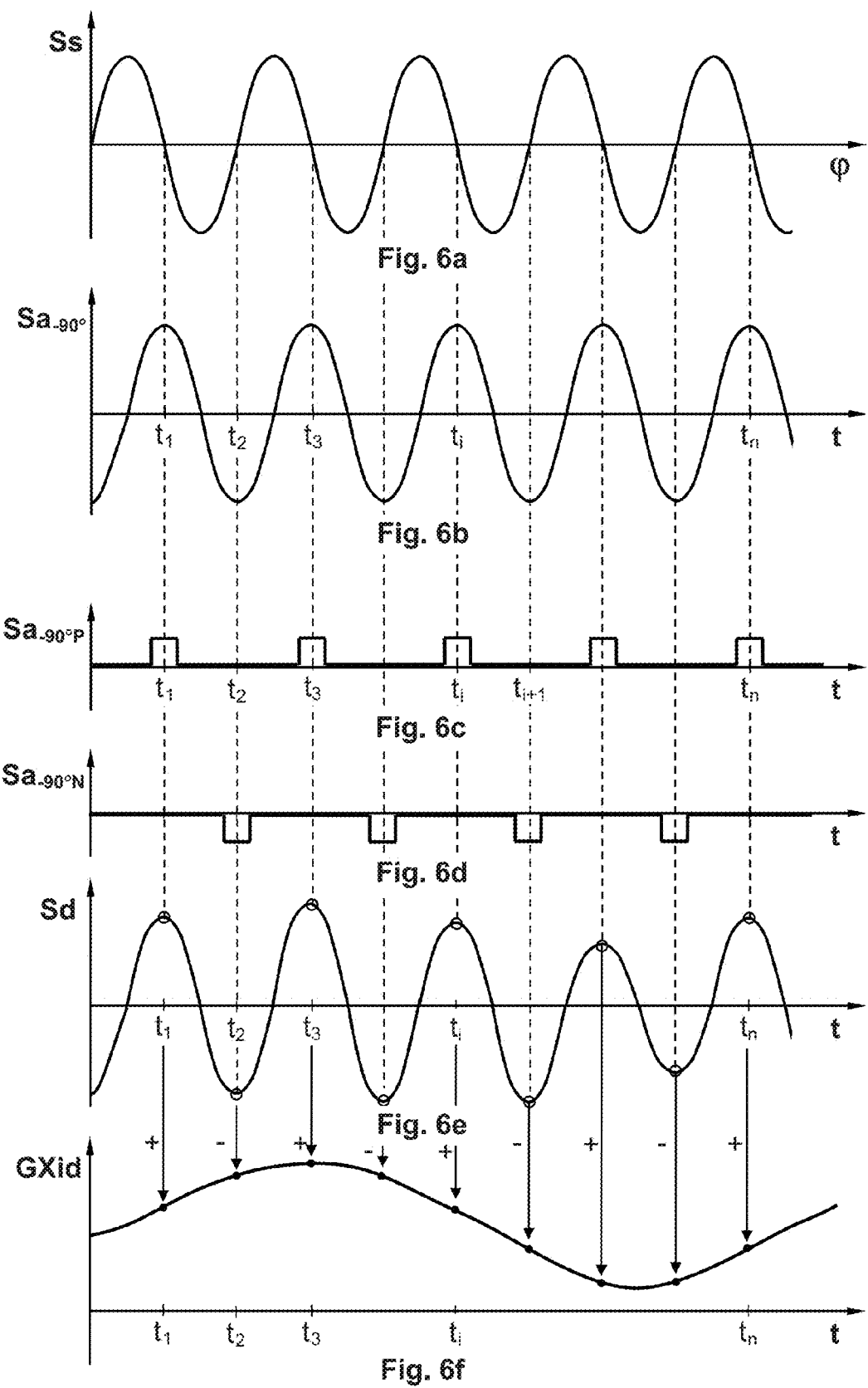
FIGS. 6a-f represent graphs exemplifying the signal flow in the apparatus according to the embodiment of the invention shown in FIG. 5.

FIG. 6a shows the electric source signal Ss as a function of the phase angle φ. The electric source signal Ss is fed into a sampling circuit SC of the processing unit PU. In this embodiment, the sampling circuit SC, in turn, includes a phase shifting unit PPh, which is configured to delay the electric source signal Ss so as to produce a delayed signal $Sa_{-90°}$, which corresponds to a –90 degrees phase shift of the electric source signal Ss.

The delayed signal $Sa_{-90°}$, which is illustrated in FIG. 6b as a function of time t, is fed to each of a first switch unit T1 and a second switch unit T2 in the sampling circuit SC. Both the switch units T1 and T2 receive the electric detection signal Sd from the receiver circuit RX. The first switch unit T1 is configured to be closed briefly, e.g. via a diode circuit and an associated capacitor C1, and thus pass through the electric detection signal Sd at time instances $t_1, t_3, \ldots, t_i, \ldots, t_n$ when the delayed signal $Sa_{-90°}$ has its maximum positive amplitude. FIG. 6c represents a signal $Sa_{-90° \, P}$, which reflects this operation of the first switch unit T1 as a function of time t. Analogously, the second switch unit T2 is configured to be closed briefly, e.g. via a diode circuit and an associated capacitor C2, and thus pass through the electric detection signal Sd at time instances $t_2, \ldots, t_{i+1}$ when the delayed signal $Sa_{-90°}$ has its maximum negative amplitude. FIG. 6d represents a signal $Sa_{-90°\ N}$, which reflects this operation of the second switch unit T2 as a function of time t.

Thus, the switch units T1 and T2 produce a respective series of sampled values $Sd_{Ps}$ and $Sd_{Ns}$ from the electric detection signal Sd. Due to the phase shift between the electric detection signal Sd) and the emitted electric source signal Ss, the time instances $t_2, t_3, \ldots, t_i, t_{i+1}, \ldots, t_n$ when the electric detection signal Sd is sampled correspond to the phase angles $\phi$ where the electric source signal Ss has zero-line passages. In other words, the processing unit PU is configured to exclusively analyze the electric detection signal Sd at predetermined phase angle shifts relative to the electric source signal Ss. As explained below, this analysis forms a basis for discriminating the identification data GXid.

More precisely, according to this embodiment of the invention, the sample values $Sd_{Ps}$ and $Sd_{Ns}$ are fed into a differential amplifier D, such that the values $Sd_{Ps}$ from the first switch unit T1 are associated with a positive sign and the values $Sd_{Ns}$ from the second switch unit T2 are associated with a negative sign. In response thereto, the differential amplifier D produces a resultant signal R, which is bandpass filtered in a filter unit BPF having a passband matched to a resonance frequency of the tag unit GX. Consequently, based on the resultant signal R, the filter unit BPF produces identification data GXid, for instance indicating identity information pertaining to an animal carrying the tag unit GX.

Preferably, the apparatus A contains, or is communicatively connected to, a memory unit M storing a computer program product, which contains software for controlling the apparatus A to perform the above-described actions when the computer program product is run on a processor in the processing unit PU.

Figure 7:
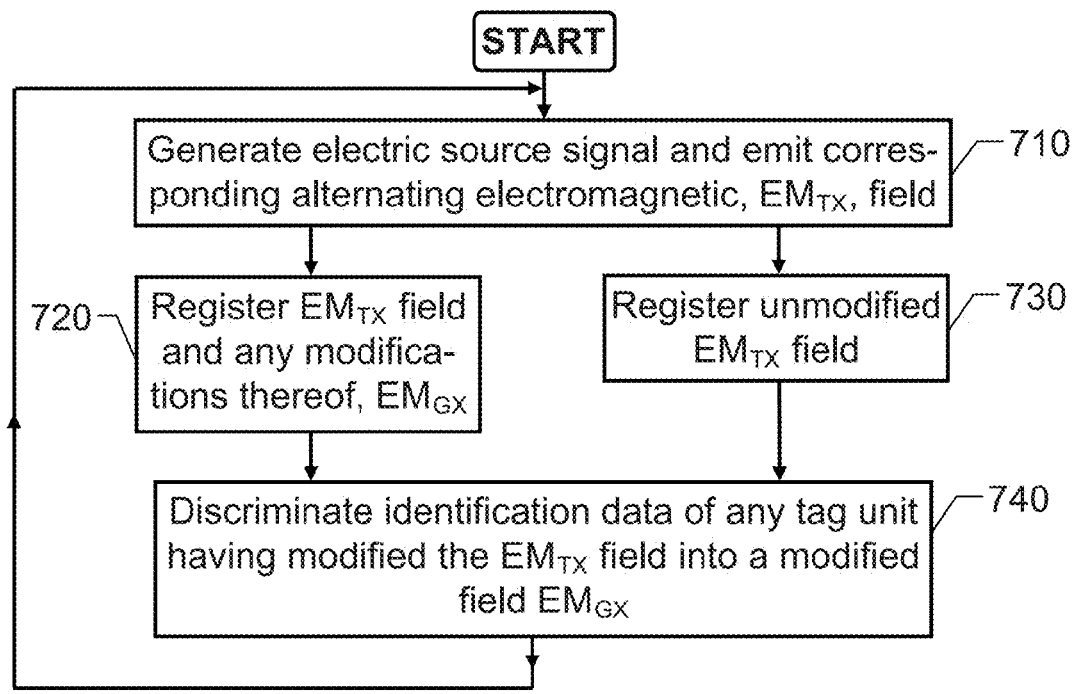
FIG. 7 illustrates, by means of a flow diagram, the general method according to the invention.

In order to sum up, we will now describe the general method according to the invention with reference to the flow diagram in FIG. 7.

In a first step 710, the transmitter circuit TX generates an electric source signal Ss and emits a corresponding alternating electromagnetic field $EM_{TX}$ from the apparatus A via a transmitter antenna TA.

A step 720, then registers the alternating electromagnetic field $EM_{TX}$ as well as any modifications thereof $EM_{GX}$ due to a tag unit within the range of operation from the apparatus A. In parallel with step 720, a step 730 registers an unmodified alternating electromagnetic field $EM_{TX}$ representing a basis for the aiding signal component Sa.

Thereafter, a step 740 discriminates the identification data GXid from the alternating electromagnetic fields $EM_{TX}$ and $EM_{GX}$ registered in step 720 by utilizing the aiding signal component Sa derived in step 730. Subsequently, the procedure loops back to step 710.

All of the process steps, as well as any sub-sequence of steps, described with reference to FIG. 7 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention.

The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EP-ROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An apparatus (A) for contactless identification of a tag unit (GX) having circuitry configured to modify an alternating electromagnetic field ($EM_{TX}$) within which the tag unit (GX) is located, the apparatus (A) comprising:
    a transmitter circuit (TX) that generates an electric source signal (Ss);
    a transmitter antenna (TA), connected to the transmitter circuit (TX), that receives the electric source signal (Ss) and, based on the source signal (Ss), emits an alternating electromagnetic field ($EM_{TX}$), the emitted alternating electromagnetic field ($EM_{TX}$) including an aiding signal component (Sa);
    a receiver circuit (RX), connected to the receiver antenna (RA), that produces an electric detection signal (Sd) in response to the received first and second portions of the alternating electromagnetic field (EMTX, EMGX) registered by the receiver antenna (RA), wherein the receiver antenna (RA) is arranged relative to the transmitter antenna (TA) and the tag unit (GX) such that the first portion of the emitted alternating electromagnetic field (EMTX) reaches the receiver antenna (RA), in an unmodified form, including when the tag unit (GX) is outside of the range of operation from the antenna (TA), and the receiver circuit (RX) further produces the aiding signal component (Sa) originating from the unmodified first portion of the alternating electromagnetic field (EMTX) received in the unmodified form; and
    a processing unit (PU) that receives the electric detection signal (Sd) and the produced aiding signal component (Sa) from the receiver circuit (RX), and based on the received electric detection signal (Sd) and the received aiding signal component (Sa), discriminates identification data (GXid) of the tag unit (GX) having caused the modification of the alternating electromagnetic field (EMGX) as emitted from the transmitter antenna (TA) to thereby identify the tag unit (GX).

2. The apparatus (A) according to claim 1, wherein the receiver antenna (RA) comprises at least one antenna coil (RA1, RA2) arranged in a transmission path for the alternating electromagnetic field ($EM_{TX}$, $EM_{GX}$) between the transmitter antenna (TA) and the tag unit (GX) within the range of operation.

3. The apparatus (A) according to claim 1, wherein the receiver antenna (RA) comprises:
at least one first antenna coil (RA1) arranged on an operative side of the transmitter antenna (TA), the at least one first antenna coil (RA1) being located in a transmission path for the alternating electromagnetic field ($EM_{TX}$, $EM_{GX}$) between the transmitter antenna (TA) and the tag unit (GX) within the range of operation, the at least one first antenna coil (RA1) receiving the second portion of the alternating electromagnetic field ($EM_{GX}$) including the modification (EMGX) and providing the second portion of the alternating electromagnetic field ($EM_{GX}$) including the modification (EMGX) to the receiver circuit (RX), and
at least one second antenna coil (RA2) arranged on a passive side of the transmitter antenna (TA), the at least one second antenna coil (RA2) receiving the first portion of the alternating electromagnetic field ($EM_{TX}$) free of the modification ($EM_{GX}$), and providing the first portion of the alternating electromagnetic field ($EM_{TX}$) free of the modification ($EM_{GX}$) to the receiver circuit (RX).

4. The apparatus (A) according to claim 1, wherein the transmitter antenna (TA) and the receiver antenna (RA) are co-located and arranged relative to each other such that during normal operation of the apparatus (A), a distance between the transmitter antenna (TA) and the receiver antenna (RA) is shorter than both i) an expected distance between the tag unit (GX) and the transmitter antenna (TA) and ii) an expected distance between the tag unit (GX) and the receiver antenna (RA).

5. An apparatus (A) of claim 1 in combination with the tag unit (GX).

6. An apparatus (A) of claim 1, wherein the identification data (GXid) of the tag unit (GX) indicate identity information pertaining to an animal carrying the tag unit (GX).

7. An apparatus (A) for contactless identification of a tag unit (GX) having circuitry configured to modify an alternating electromagnetic field ($EM_{TX}$) within which the tag unit (GX) is located, the apparatus (A) comprising:
a transmitter circuit (TX) that generates an electric source signal (Ss);
a transmitter antenna (TA), connected to the transmitter circuit (TX), that receives the electric source signal (Ss) and, based on the source signal (Ss), emits an alternating electromagnetic field ($EM_{TX}$), the emitted alternating electromagnetic field ($EM_{TX}$) including an aiding signal component (Sa);
a receiver antenna (RA) that registers i) a first portion of the alternating electromagnetic field ($EM_{TX}$) as emitted from the transmitter antenna (TA), and ii) a second portion of the alternating electromagnetic field ($EM_{GX}$), the second portion of the alternating electromagnetic field ($EM_{GX}$) including a modification ($EM_{GX}$) of the alternating electromagnetic field (EMTX) as emitted from the transmitter antenna (TA), caused by the tag unit (GX) within a range of operation from the transmitter antenna (TA);
a receiver circuit (RX), connected to the receiver antenna (RA), that produces an electric detection signal (Sd) in response to the received first and second portions of the alternating electromagnetic field ($EM_{TX}$, $EM_{GX}$) registered by the receiver antenna (RA); and
a processing unit (PU) that receives the electric detection signal (Sd), and based on the electric detection signal (Sd), discriminates identification data (GXid) of the tag unit (GX) having caused the modification of the alternating electromagnetic field ($EM_{GX}$) as emitted from the transmitter antenna (TA), wherein,
the receiver antenna (RA) is arranged relative to the transmitter antenna (TA) and the tag unit (GX) such that the first portion of the emitted alternating electromagnetic field ($EM_{TX}$) reaches the receiver antenna (RA) including when the tag unit (GX) is outside of the range of operation from the antenna (TA), and
the processing unit (PU) discriminates the identification data (GXid) by utilizing the aiding signal component (Sa) originating from the first portion of the alternating electromagnetic field ($EM_{TX}$),
wherein the processing unit (PU) operates to:
derive the aiding signal component (Sa) from the received first portion of the alternating electromagnetic field ($EM_{TX}$) to represent a phase angle ($\phi$) of the electric source signal (Ss) as a function of time ($Sa_{-90°}$), and
discriminate the identification data (GXid) based on phase variations of the electric detection signal (Sd) relative to the phase angle ($\phi$) of the electric source signal (Ss).

8. The apparatus (A) according to claim 7, wherein the processing unit (PU) operates to discriminate the identification data (GXid) by exclusively analyzing the electric detection signal (Sd) at predetermined phase angle shifts relative to the electric source signal (Ss).

9. The apparatus according to claim 8, wherein the processing unit (PU) operates to discriminate the identification data (GXid) by exclusively analyzing the electric detection signal (Sd) at time instances ($t_1, t_2, t_3, t_i, t_n$) corresponding to phase angles ($\phi$) where the electric source signal (Ss) has zero-line passages.

10. The apparatus (A) according to claim 9, further comprising an auxiliary antenna (SWA) that receives the aiding signal component (Sa) and forwards the aiding signal component (Sa) to the processing unit (PU).

11. The apparatus (A) according to claim 10, wherein the processing unit (PU) comprises:
a sampling circuit (SC) that samples the electric detection signal (Sd) at the time instances ($t_1, t_2, t_3, t_i, t_n$) corresponding to the phase angles ($\phi$) where the electric source signal (Ss) has zero-line passages and thus produces sample values ($Sd_{Ps}, Sd_{Ns}$),
a differential amplifier (D) that receives the sample values ($Sd_{Ps}, Sd_{Ns}$), and based on the sample values ($Sd_{Ps}, Sd_{Ns}$) forms a resultant signal (R) containing a signal component representing the identification data (GXid), and
a filter unit (BPF) that bandpass filters the resultant signal (R) to produce the identification data (GXid).

12. A method of contactless identification of a tag unit (GX) having circuitry configured to modify an alternating electromagnetic field (EM) within which the tag unit (GX) is located, the method comprising:
using a transmitter circuit (TX), generating an electric source signal (Ss);
emitting, based on the generated electric source signal (Ss), an alternating electromagnetic field ($EM_{TX}$) from a transmitting antenna (TA), the emitted alternating electromagnetic field ($EM_{TX}$) including an aiding signal component (Sa);
registering, via a receiver antenna (RA), i) a first portion of the alternating electromagnetic field ($EM_{TX}$) in unmodified from as emitted from the antenna (TA), and ii) a second portion of the alternating electromagnetic field ($EM_{GX}$), the second portion of the alternating electromagnetic field ($EM_{GX}$) including a modification ($EM_{GX}$) of the alternating electromagnetic field (EMTX) as emitted from the antenna (TA), caused by the tag unit (GX) within a range of operation from the antenna (TA), wherein the receiver antenna (RA) is arranged relative to the transmitter antenna (TA) and the tag unit (GX) such that the first portion of the emitted alternating electromagnetic field ($EM_{TX}$) reaches the receiver antenna (RA) in the unmodified form, including when the tag unit (GX) is outside of the range of operation from the antenna (TA);

with a receiver circuit (RX) connected to the receiver antenna (RA), producing i) an electric detection signal (Sd) in response to the received first and second portions of the alternating electromagnetic field ($EM_{TX}$, $EM_{GX}$) registered by the receiver antenna (RA), and ii) producing the aiding signal component (Sa) originating from the first portion of the alternating electromagnetic field (EMTX) received in the unmodified form; and with a processing unit (PU) that receives the electric detection signal (Sd) and the aiding signal component (Sa) from the receiver circuit (RX), and based on the electric detection signal (Sd) the aiding signal component (Sa) from the receiver circuit (RX), discriminating identification data (GXid) of the tag unit (GX) having caused the modification of the alternating electromagnetic field ($EM_{GX}$) as emitted from the antenna (TA) to thereby identify the tag unit (GX).

13. The method according to claim 12, wherein the receiver antenna (RA) used in the registering step comprises at least one antenna coil (RA1, RA2) arranged in a transmission path for the alternating electromagnetic field ($EM_{TX}$, $EM_{GX}$) between the transmitter antenna (TA) and the tag unit (GX) within the range of operation.

14. The method according to claim 12, wherein,
the receiver antenna (RA) used in the registering step comprises i) at least one first antenna coil (RA1) that receives the second portion of the alternating electromagnetic field (EMGX) including the modification (EMGX) and is arranged on an operative side of the transmitter antenna (TA) in a transmission path for the alternating electromagnetic field ($EM_{TX}$, $EM_{GX}$) between the transmitter antenna (TA) and a tag unit (GX) within the range of operation, and ii) at least one second antenna coil (RA2) that receives the first portion of the alternating electromagnetic field ($EM_{TX}$) as emitted from the antenna (TA) and free of the modification (EMGX), and is arranged on a passive side of the transmitter antenna (TA).

15. The method according to claim 12, further comprising:
deriving the aiding signal component (Sa) to represent a phase angle (φ) of the electric source signal (Ss) as a function of time ($Sa_{-90°}$); and
discriminating the identification data (GXid) based on phase variations of the electric detection signal (Sd) relative to the phase angle (φ) of the electric source signal (Ss).

16. The method according to claim 15, further comprising discriminating the identification data (GXid) by exclusively analyzing the electric detection signal (Sd) at predetermined phase angle shifts relative to the electric source signal (Ss).

17. The method according to claim 16, further comprising discriminating the identification data (GXid) by exclusively analyzing the electric detection signal (Sd) at time instances ($t_1$, $t_2$, $t_3$, $t_i$, $t_n$) corresponding to phase angles (φ) where the electric source signal (Ss) has zero-line passages.

18. The method according to claim 17, further comprising:
sampling the electric detection signal (Sd) at the time instances ($t_1$, $t_2$, $t_3$, $t_i$, $t_n$) corresponding to the phase angles (φ) where the electric source signal (Ss) has zero-line passages to produce sample values ($Sd_{Ps}$, $Sd_{Ns}$);
forming, based on the sample values ($Sd_{Ps}$, $Sd_{Ns}$), a resultant signal (R) containing a signal component representing the identification data (GXid); and
bandpass filtering the resultant signal (R) to produce the identification data (GXid).

19. A method of claim 12, wherein the identification data (GXid) of the tag unit (GX) indicate identity information pertaining to an animal carrying the tag unit (GX).

20. A non-transitory computer readable medium (M), having a program recorded thereon that when executed on a computer causes the computer to control the steps of claim 12.

* * * * *